Dec. 8, 1931.  R. J. POMEROY  1,835,962
SYSTEM FOR MODIFYING SOUND RECORDS
Original Filed March 10, 1928
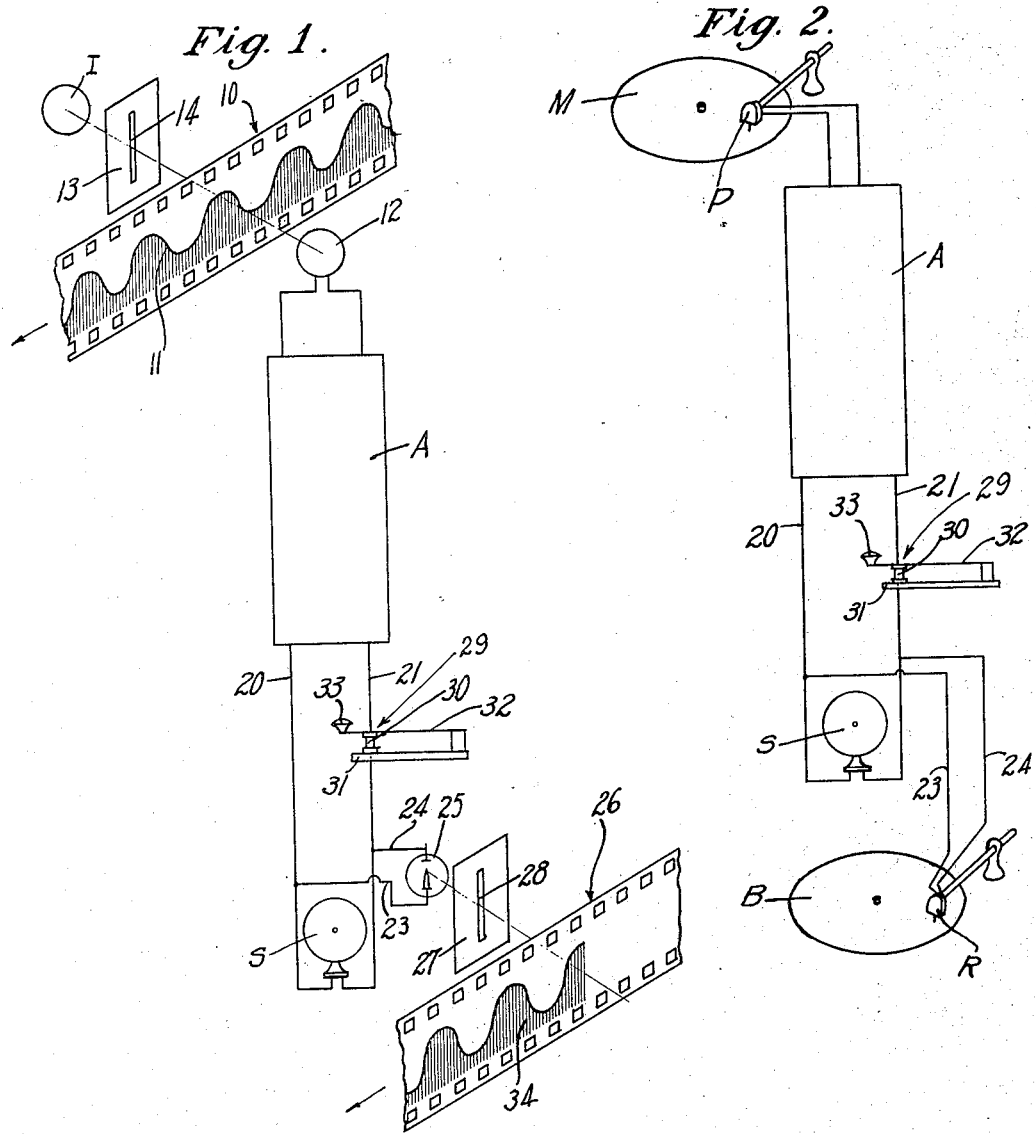
Inventor
Roy J. Pomeroy.
Attorney.

Patented Dec. 8, 1931

1,835,962

UNITED STATES PATENT OFFICE

ROY J. POMEROY, OF HOLLYWOOD, CALIFORNIA

SYSTEM FOR MODIFYING SOUND RECORDS

Application filed March 10, 1928, Serial No. 260,698. Renewed June 6, 1931.

This invention has to do with sound records, and it is an object of this invention to provide means for modifying or varying the volume characteristics of a sound record. This is to be done, not by a definite amount to the record as a whole, but by any desired varying degree along the record, and dependent only upon the ear and judgment of an operator. Such a provision has a number of useful applications, but perhaps has its greatest value when utilized in connection with talking pictures, or pictures having an accompanying musical or other score carried upon a sound record, the advantage in thus being able to artificially modify the volume characteristics of the record to match the temper of the accompanied picture being apparent.

The invention, in certain phases, may be adapted with equal facility to either a mechanical or a photographic record, while in other phases, is more particularly adapted to the photographic type of record. The system of the invention will therefore be described with both types of record in view, but being particularized with the photographic adaptation. It will be understood, however, that such a typification is not to be construed as limiting the invention thereto.

The invention will be best understood from the following detailed description of a system and methods for carrying the invention into effect, reference for the purpose being had to the accompanying drawings, in which:

Figure 1 shows one suitable system for making a modified photographic sound record; and Fig. 2 shows a suitable system for making a modified mechanical sound record.

Photographic records, such as I have reference to, may be of several well known types. One such record consists of a shaded band of constant density, a variable or wavy outline representing the sound character. Another type consists of a shaded band of constant width, variable density representing sound character. Or the record may consist of a combination of these forms. All such photographic records, as well as mechanical records, and in fact, all types of records capable of being recorded and reproduced by electrical means are adaptable to the invention.

With particular reference to Fig. 1, the numeral 10 indicates a traveling photographic film having a variable or wavy outline original sound record 11. For simplicity of illustration, only the record of a continuous uniform sound is shown in the drawings, but it will be understood that any complex sound record will function in the same manner. Opposite one side of the film 10 is an illuminant I and upon the other side of the film is a photo-electric cell 12. A plate 13 having a slit 14 is placed between the illuminant and the film. Light rays transmitted from the illuminant through the slit 14 will be modulated by the sound record 11 upon the traveling film 10, and will then affect the photo-electric cell 12, which thereupon conducts a sound current into the amplifier A, in accordance with well known principles.

The output leads 20, 21 of the amplifier A are connected to a speaker unit S. In parallel with the speaker S is a circuit 23, 24 containing a glow tube 25 or other light varying device. Traveling before glow tube 25 is a film 26, and therebetween is a plate 27 having a slit 28. The glow tube 25 is fed by the same sound current that actuates the speaker S, and the film 26 therefore takes a sound record corresponding to the sound as reproduced by speaker S. A manually operable variable resistance is included in the output circuit 20, 21 as at 30. This may be either in series circuit, as shown in the figures, or in parallel across 20, 21.

This variable resistance may be of any convenient type, a suitable form being indicated in the figures, in which is shown a carbon button resistance 30 mounted between a base 31 and a spring arm 32 supported upon the base. Arm 32 may be provided with a key 33, and the electrical resistance of the carbon button is varied by pressure upon this key. The terminals of the carbon button are electrically connected into the circuit 20, 21 as shown.

With the system so arranged, the method of operation is as follows: The film 10 with the original sound record 11 is run before its photo-electric cell, and the sound is reproduced by the speaker S. Circuit 23, 24, which contains glow tube 25, being in parallel with the speaker S, the glow tube prints upon film 26 a record 34 of sound as reproduced by the speaker.

An operator, listening to the sound reproduced by the speaker S, may then vary the volume characteristics of this sound by varying the pressure upon key 33, this having the combined effect of varying the resistances (and consequently the magnitude and amplitude of the sound currents) in both circuits 20, 21 and 23, 24. The recording system, being fed by circuit 23, 24, thus takes a sound record of modified sound as heard from the speaker S, the volume of this sound being under control of the operator at all times.

A modified record is thus obtained which, upon subsequent reproduction, will render the original record modified by the artificial volume modulations imposed by the operator as the record was being made.

The invention, in the form so far disclosed, is applicable to any type of sound record, photographic, mechanical or of any other type. For instance, as illustrated in Fig. 2, an equivalent system to that of Fig. 1 but adapted to mechanical records might contain a mecahnical record M and an electromagnetic pick-up P in place of the photographic film 10, illuminant I, slit 14, and photo-electric cell 12, and a mechanical blank B and electric-magnetic recording means R substituted for the glow tube 25, slit 28, and recording film 26. A modified mechanical record may thus be made in a similar manner to the photographic record, as will be understood.

Reference is here directed to my application entitled "Modification of sound records," filed Sept. 25, 1931, Ser. No. 562,894, which application discloses subject matter divided from the present case.

Various modifications and rearrangements of the elements of the system are at once apparent, and the invention is therefore to be considered as embracing all such equivalent forms of the method and system.

I claim:

1. The method of making a modified photographic sound record that consists in producing an electrical sound current from an original photographic sound record, and simultaneously audibly reproducing sound from the said sound current, photographically recording the sound current, and manually controlling its strength and thereby its volume characteristics.

2. The method of making a modified photographic sound record that consists in producing an electrical sound current from an original photographic sound record, audibly reproducing sound from the sound current continuously variably controlling the strength of the sound current to modulate the volume characteristics of the sound, and simultaneously making a photographic sound record of the sound current as artificially modulated in reproduction.

3. In a system for making a volume-modified sound record, photo-electric means for producing a sound current from an original photographic sound record, an electrical amplifier having its input circuit connected to said sound current-producing means, sound reproducing means connected to the output circuit of said amplifier, photographic sound recording means connected to the output circuit of said amplifier, and manually actuated sound current controlling means in the output circuit of said amplifier and adapted to vary the volume characteristics of the sound current therein that simultaneously actuates the sound reproducing means and the photographic sound recording means.

In witness that I claim the foregoing I have hereunto subscribed my name this 27 day of February, 1928.

ROY J. POMEROY.